(12) United States Patent
Zotto et al.

(10) Patent No.: US 11,360,872 B2
(45) Date of Patent: Jun. 14, 2022

(54) CREATING STATISTICAL ANALYSES OF DATA FOR TRANSMISSION TO SERVERS

(71) Applicant: Hewlett-Packard Development Company, L.P., Spring, TX (US)

(72) Inventors: Rafael Dal Zotto, Porto Alegre (BR); Matheus Eichelberger, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,510

(22) PCT Filed: Oct. 18, 2018

(86) PCT No.: PCT/US2018/056423
§ 371 (c)(1),
(2) Date: Oct. 14, 2020

(87) PCT Pub. No.: WO2020/081077
PCT Pub. Date: Apr. 23, 2020

(65) Prior Publication Data
US 2021/0232474 A1    Jul. 29, 2021

(51) Int. Cl.
*G06F 11/00*    (2006.01)
*G06F 11/30*    (2006.01)
*G06F 11/34*    (2006.01)
*G06F 21/56*    (2013.01)

(52) U.S. Cl.
CPC ...... *G06F 11/3051* (2013.01); *G06F 11/3006* (2013.01); *G06F 11/3075* (2013.01); *G06F 11/3466* (2013.01); *G06F 21/566* (2013.01)

(58) Field of Classification Search
CPC ............. G06F 11/0751; G06F 11/0757; G06F 11/3006; G06F 11/3051; G06F 11/3075; G06F 11/3466
See application file for complete search history.

(56) References Cited

U.S. PATENT DOCUMENTS

| 6,167,358 | A | 12/2000 | Othmer et al. |
| 6,263,457 | B1 | 7/2001 | Anderson et al. |
| 6,418,334 | B1 * | 7/2002 | Unger .................. G16H 40/40 600/407 |
| 6,487,478 | B1 * | 11/2002 | Azzaro .................. B60L 3/12 340/3.1 |
| 6,499,114 | B1 | 12/2002 | Almstead et al. |
| 2007/0168915 | A1 * | 7/2007 | Fabbio ................ G06F 11/0751 717/101 |
| 2008/0288210 | A1 | 11/2008 | Imahara et al. |

(Continued)

FOREIGN PATENT DOCUMENTS

| CN | 105354128 | 2/2016 |
| EP | 1195681 | 4/2002 |

*Primary Examiner* — Charles Ehne
(74) *Attorney, Agent, or Firm* — Conley Rose PC

(57) ABSTRACT

An example of a non-transitory computer-readable medium storing machine-readable instructions. The instructions may cause the processor to receive a configuration file that identifies data sources coupled to the processor. The instructions may cause the processor to collect a data set from the data source based on data from the configuration file. The instructions may cause the processor to create a statistical analysis based on the data set and transmit the statistical analysis to a server.

13 Claims, 6 Drawing Sheets

(56) References Cited

U.S. PATENT DOCUMENTS

| | | |
|---|---|---|
| 2010/0312546 A1 | 12/2010 | Chang et al. |
| 2013/0238561 A1 | 9/2013 | Subramaniam |
| 2014/0380058 A1 | 12/2014 | Agarwal et al. |
| 2015/0256423 A1 | 9/2015 | Stearns |
| 2016/0182415 A1 | 6/2016 | Ames et al. |
| 2017/0235848 A1 | 8/2017 | Van Dusen et al. |

* cited by examiner

CREATING STATISTICAL ANALYSES OF DATA FOR TRANSMISSION TO SERVERS

BACKGROUND

Fleet management applications for computer systems may collect data on the operation of computer systems used within a company. The collected data may be analyzed on a central server and used to modify the operation of the company network and in evaluating the needs of the company's fleet of computer systems.

BRIEF DESCRIPTION OF THE DRAWINGS

Various examples will be described below referring to the following figures.

DETAILED DESCRIPTION

Figure 1:
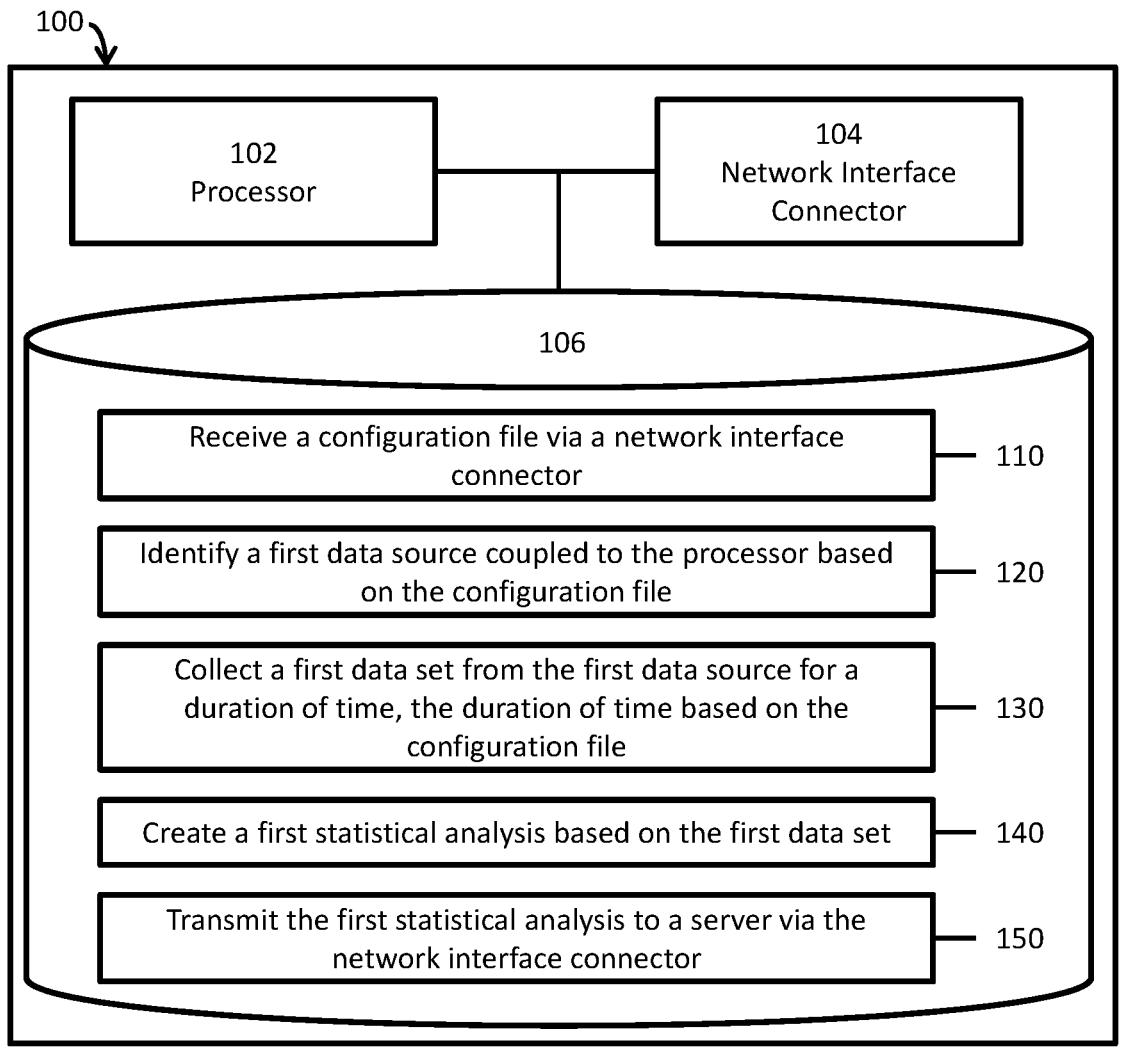
FIG. 1 shows a computer system with a processor and computer-readable medium storing machine-readable instructions to cause the processor to create a statistical analysis of a data set for transmission to a server in accordance with various examples.

Collecting data on a fleet of computer systems at a company and transmitting the data to a server may cause network congestion and result in a large amount of data to analyze on the server. Such a large amount of data may use additional storage space, especially if a record of past data is maintained.

The individual computer systems may perform a statistical analysis on the collected data, transmitting the statistical analysis to the server. The server may analyze the statistical analysis alone or in conjunction with other statistical analyses from the same or different computer systems. Coordination of the collection of data from different data sources associated with a computer system may enable the finding of relationships between data from different data sources.

In one example in accordance with the present disclosure, an apparatus is provided. The apparatus comprises a non-transitory computer-readable medium storing machine-readable instructions that, when executed by a processor, cause the processor to: receive a configuration file via a network interface connector; identify a first data source coupled to the processor based on the configuration file; collect a first data set from the first data source for a duration of time, the duration of time based on the configuration file; create a first statistical analysis based on the first data set; and transmit the first statistical analysis to a server via the network interface connector.

In one example in accordance with the present disclosure, an apparatus is provided. The apparatus comprises a non-transitory computer-readable medium storing machine-readable instructions that, when executed by a processor, cause the processor to: receive a configuration file via a network interface connector; identify a data group based on the configuration file, the data group comprising a first data source and a second data source; identify a duration of time and a sampling frequency for the data group based on the configuration file; collect a first data set from the first data source based on the duration of time and the sampling frequency; collect a second data set from the second data source based on the duration of time and the sampling frequency; create a first statistical analysis based on the first data set; create a second statistical analysis based on the second data set; and transmit the first statistical analysis and the second statistical analysis to a server via the network interface connector.

In one example in accordance with the present disclosure, an apparatus is provided. The apparatus comprises a non-transitory computer-readable medium storing machine-readable instructions that, when executed by a processor, cause the processor to: receive a configuration file; identify a first data group based on the configuration file, the first data group comprising a first data source; identify a second data group based on the configuration file, the second data group comprising a second data source; identify a first start time and a first sampling frequency for the first data group based on the configuration file; identify a second start time and a second sampling frequency for the second data group based on the configuration file; collect a first data set from the first data source starting at the first start time and sampling at the first sampling frequency; collect a second data set from the second data source starting at the second start time and sampling at the second sampling frequency; calculate a first mean based on the first data set; calculate a second mean based on the second data set; transmit the first mean to a server; and transmit the second mean to the server.

FIG. 1 shows a computer system 100 with a processor 102 and computer-readable medium 106 storing machine-readable instructions 110, 120, 130, 140, 150 to cause the processor 102 to create a statistical analysis of a data set for transmission to a server in accordance with various examples. Machine-readable instruction 110, when executed by the processor 102, may cause the processor 102 to receive a configuration file via a network interface connector 104. Machine-readable instruction 120, when executed by the processor 102, may cause the processor 102 to identify a first data source coupled to the processor 102 based on the configuration file. Machine-readable instruction 130, when executed by the processor 102, may cause the processor 102 to collect a first data set from the first data source for a duration of time, the duration of time based on the configuration file. Machine-readable instruction 140, when executed by the processor 102, may cause the processor 102 to create a first statistical analysis based on the first data set. Machine-readable instruction 150, when executed by the processor 102, may cause the processor 102 to transmit the first statistical analysis to a server via the network interface connector 104.

In various examples, the processor 102 may comprise a microprocessor, a microcomputer, a controller, a field programmable gate array (FPGA), or discrete logic to execute machine-readable instructions. The processor 102 may be part of a computer system 100, such as a laptop or desktop computer, a server, a cell phone, tablet, or an Internet of things (IoT) device. The processor 102 may be coupled to the computer-readable medium 106 and the network interface connector 104, such as via a bus. The processor 102 may execute the instructions 110, 120, 130, 140, 150 in the computer-readable medium 106 discussed in connection with this and the other figures. The computer-readable medium 106 may store the data as it is collected from the data source. The computer-readable medium 106 may include a hard drive, solid state drive (SSD), flash memory, electrically erasable programmable read-only memory (EEPROM), or random access memory (RAM). The network interface connector 104 may comprise a network device to provide an Ethernet connection, USB connection, wireless connection, or other connection. The network interface connector 104 may enable access to a private corporate network or the Internet.

In various examples, the configuration file may be include information in a format such as JSON (JavaScript Object Notation), XML (eXtensible Markup Language), YAML (YAML Ain't Markup Language), text, or other appropriate format. The configuration file may be specific to an individual computer system 100, re-used across computer systems of the same or comparable models, or used across a wide variety of computer systems. A configuration file may be created for a computer system 100 that includes three temperature sensors for different parts of the processor 102. The configuration file may specify that all three or a specific subset of the three temperature sources be used as a data source. The configuration file may be generic to multiple models of computer systems. The configuration file may specify that a data source provide the temperature of the processor 102. If the processor 102 includes three temperature sensors, one temperature sensor may be selected and used or data may be aggregated from all three temperature sensors, such as picking the one with the highest temperature at the time of measurement. The configuration file may specify a data source that does not exist on a specific computer system, such as requesting a temperature of a graphics processor for a server that does not have a dedicated graphics processor. The data set or analysis may provide some indication that no such data source is available on that computer system.

Data sources may include various sensors, such as temperature sensors, acoustic sensors, vibration sensors, voltage sensors, current sensors, light sensors, humidity sensors, barometric pressure sensors, and rotary encoders. These data sources may collect data on various components, such as a processor, graphics processor, hard drive, keyboard, mouse, or fan. Data sources may include determinations of processor utilization, RAM utilization, free capacity of long-term storage such as a hard drive, application logs, operating system updates, installation and uninstallation of applications, recording keystrokes or mouse interactions, and applications running on the processor. In various examples, a configuration file may specify to collect data on the temperature of the processor 102, voltage and current powering the processor 102, utilization of the processor 102, the applications being executed on the processor 102 and utilization of the processor 102 by those applications, and the speed of a fan for cooling the processor 102. A configuration file may specify collection of data on a battery temperature, input and output voltage and current values for the battery, and remaining battery charge.

In various examples, multiple configuration files may specify the collection of data from different or overlapping data sources during the same duration of time. One configuration file may specify collection of data from data sources related to the processor 102, which may include a processor utilization value. A second configuration file may specify collection of data from data sources related to memory, which may include a processor utilization value. The configuration files may specify the same durations of time for the data collections that overlap but may specify different sampling frequencies.

The processor 102 may create a statistical analysis based on the collected data set. The statistical analysis may include calculating a mean, median, mode, standard deviation, maximum value, minimum value, variance, sample size, or various quantiles, such as a first, second, and third quartile, or quintiles. Other statistical analyses may be performed.

Transmitting statistical analyses of the data set rather than the full data set may affect performance of the computer system 100, server, and overall system. At the computer system 100, the statistical analyses may allow the data to be analyzed and discarded, rather than stored till it can be transmitted to the server. The computer system 100 may perform the analyses when the computer system 100 is experiencing a low workload, as to minimize disruption to a user. At the server, the statistical analyses may use less storage space than the underlying data. The server may use less computational resources to analyze and compare the statistical analyses than analyzing and comparing the underlying data. The network between the server and fleet of computer systems may be less congested by the transmission of statistical analyses that use less storage than the underlying data.

In various examples, the configuration file may be received from the server to which the statistical analysis is transmitted. The configuration file may include information indicating the server to which the statistical analysis is to be transmitted, which may be another server.

In various examples, the computer system 100 may store the underlying data sets for some time after transmission of the statistical analyses. This may allow the server to request the underlying data for a more detailed analysis. The computer system 100 may collect multiple data sets or store multiple statistical analyses between transmissions of the statistical analyses to the server. For example, a computer system 100 may collect a temperature of a processor 102 every minute for an hour and perform a statistical analysis on that data set. Once per day, the computer system 100 may transmit twenty-four such statistical analyses, one per hour of the past day, to the server. The computer system 100 may retain the underlying data for twenty-four hours after transmission before deleting the data. The statistical analyses may be retained in the computer-readable medium 106 for a year before being deleted. Retaining the statistical analyses in the computer-readable medium 106 may allow the data to be displayed to a user on that computer system 102. The statistical analyses transmitted to the server may be used or viewed by a systems administrator.

Figure 2:
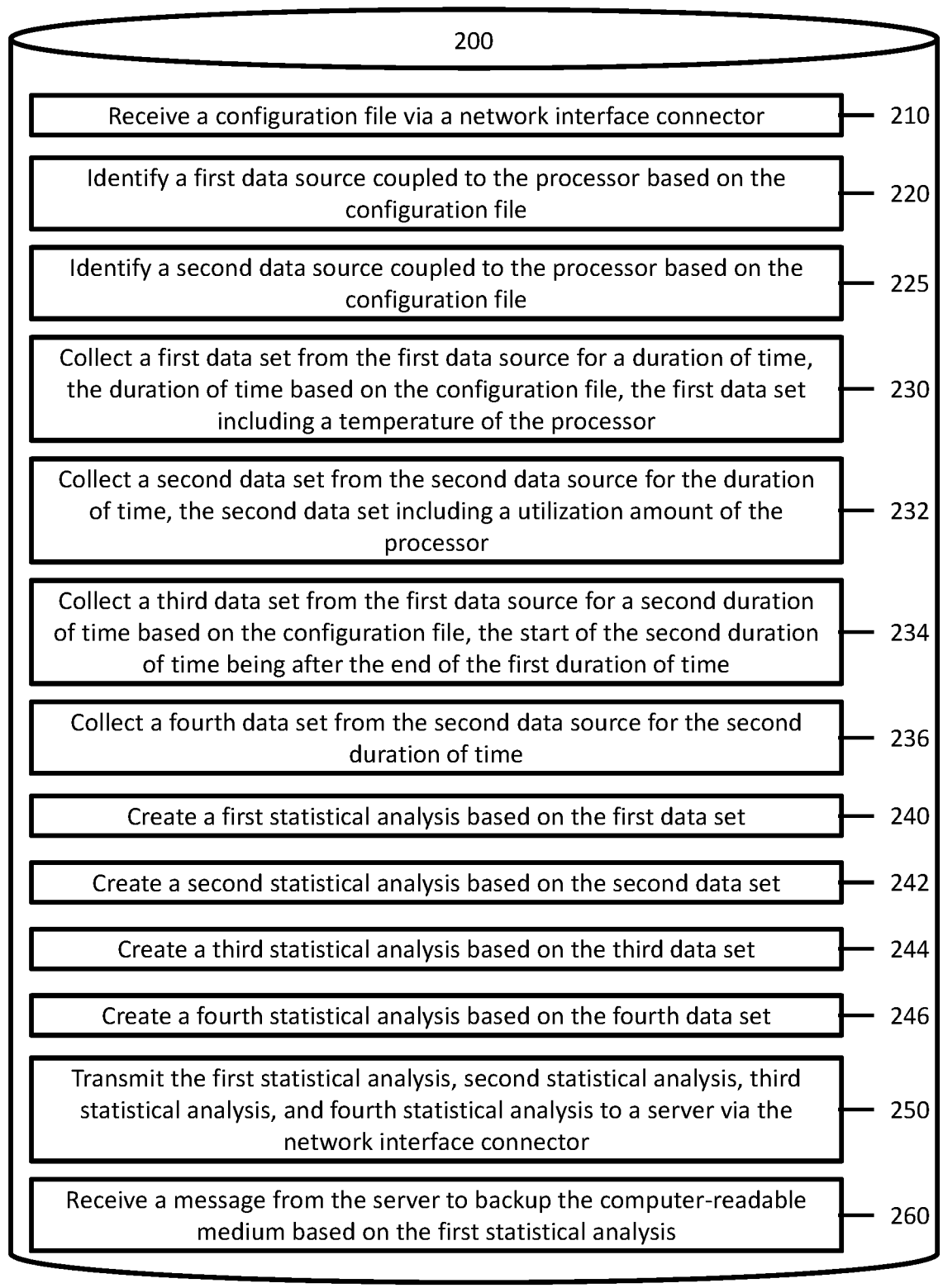
FIG. 2 shows a computer-readable medium storing machine-readable instructions to cause a processor to create statistical analyses of data sets for transmission to a server and receive a message from the server to backup the computer-readable medium based on a statistical analysis in accordance with various examples.

FIG. 2 shows a computer-readable medium 200 storing machine-readable instructions 210, 220, 225, 230, 232, 234,

236, 240, 242, 244, 246, 250, 260 to cause a processor to create statistical analyses of data sets for transmission to a server and receive a message from the server to backup the computer-readable medium based on a statistical analysis in accordance with various examples. Machine-readable instruction 210, when executed by the processor, may cause the processor to receive a configuration file via a network interface connector. Machine-readable instruction 220, when executed by the processor, may cause the processor to identify a first data source coupled to the processor based on the configuration file. Machine-readable instruction 225, when executed by the processor, may cause the processor to identify a second data source coupled to the processor based on the configuration file. Machine-readable instruction 230, when executed by the processor, may cause the processor to collect a first data set from the first data source for a duration of time, the duration of time based on the configuration file, the first data set including a temperature of the processor. Machine-readable instruction 232, when executed by the processor, may cause the processor to collect a second data set from the second data source for the duration of time, the second data set including a utilization amount of the processor. Machine-readable instruction 234, when executed by the processor, may cause the processor to collect a third data set from the first data source for a second duration of time based on the configuration file, the start of the second duration of time being after the end of the first duration of time. Machine-readable instruction 236, when executed by the processor, may cause the processor to collect a fourth data set from the second data source for the second duration of time. Machine-readable instruction 240, when executed by the processor, may cause the processor to create a first statistical analysis based on the first data set. Machine-readable instruction 242, when executed by the processor, may cause the processor to create a second statistical analysis based on the second data set. Machine-readable instruction 244, when executed by the processor, may cause the processor to create a third statistical analysis based on the third data set. Machine-readable instruction 246, when executed by the processor, may cause the processor to create a fourth statistical analysis based on the fourth data set. Machine-readable instruction 250, when executed by the processor, may cause the processor to transmit the first statistical analysis, second statistical analysis, third statistical analysis, and fourth statistical analysis to a server via the network interface connector. Machine-readable instruction 260, when executed by the processor, may cause the processor to receive a message from the server to backup the computer-readable medium based on the first statistical analysis.

The configuration file may include a duration of time. The duration of time may be specified as an amount of time. The duration of time may be specified as a start time and a stop time. The configuration file may include a sampling frequency. An offset time may exist between a start time and when an actual sample is collected. The configuration file may specify an offset time or an offset time may be inherent in the system. In various examples, the start time may occur. The processor may request a data point from the data source after the start time. It may involve a time delay for the data source to receive the request and provide the processor with the data point. An additional time delay may be involved before the processor receives the data point and stores it for a later statistical analysis.

The processor may receive information about the delays involved in collecting a data point from a data source. The processor may use the information about the delays to minimize time differences in the collection of data. In various examples, the processor may receive information that a processor temperature sensor collects data between one and five microseconds after the processor requests the data. The processor may receive information that a battery temperature sensor collects data between three and seven milliseconds after the processor requests the data. To reduce offsets in the data collection, the processor may request the battery temperature and then request the processor temperature approximately five milliseconds later.

In various examples, the configuration file may include information for collecting recurring data sets for analysis. The configuration file may indicate processor temperature is to be collected once per minute for an hour as a data set. The configuration file may indicate such data sets are to be collected for 72 hours. The configuration file may include a parameter indicating the data sets are to be continually collected without any stopping time. The configuration file may include gaps in the collection. The collection may occur between normal business hours and not be collected during non-business hours or over the weekends or holidays. The configuration file may specify the collection of a data set is to occur once per day or at some other interval of time. The configuration file may specify the collection of data at random or pseudo-random times.

The server may send messages to the processor based on the statistical analysis. The messages may indicate a type of operation that should be performed by the processor or components coupled to the processor. In various examples, the message may include an instruction to perform a backup of the computer-readable medium. This may occur when the server determines the computer system, or a component thereof, is unstable and in danger of crashing or losing data. The server may additionally make suggestions to systems administrators to initiate a repair or service call on the computer system corresponding to the processor. The message from the server may include an instruction to install, update, or delete an application, such as a device driver or other program installed or running on the computer system of the processor. The message from the server may request additional data collection, which may be specified by a configuration file. The message from the server may request a system scan be performed. The system scan may include a virus scan, malware scan, or a diagnostic scan, such as on memory or storage coupled to the processor. The message may include instructions to modify a system setting, system configuration, or a setting or configuration of a particular component of the system. This may, for example, include changing the screen resolution or refresh rate for a display, changing the time of a regularly scheduled system scan, disabling a hardware device, modifying the power plan between optimizing power consumption and providing higher performance, or emptying a deleted or temporary files folder. The message may include instructions to perform a system backup or restore. The message may include instructions to update, install, or uninstall an application.

Collecting data from different data sources using the same, or nearly the same, durations of time, sampling frequencies, and offsets may allow the statistical analyses to be jointly analyzed. In various examples, a data set regarding the processor utilization, processor temperature, and fan speed collected using the same, or nearly the same, parameters may be jointly analyzed to identify an issue. If the processor utilization and processor temperature show a spike in the maximum utilization and temperature, but the fan speed does not show a corresponding spike, it may indicate an issue with the fan. Such a conclusion may not be proper if the statistical analysis for the fan speed was made from a data set that began a half hour after the data set recorded for the processor utilization and temperature. The spike may have occurred during that non-overlapping half hour. Using the same, or nearly the same, sampling frequencies and offsets may also affect the ability to jointly analyze the statistical analyses from different data sources. For example, measuring the fan speed once every minute but the processor temperature every 20 seconds, or with a 10 second offset between them, may result in temperature spikes, while corresponding fan speed spikes may not be collected. Measuring both every 20 seconds with zero or minimal offset between them may capture the corresponding spikes or be a reliable indication of a malfunction.

Figure 3:
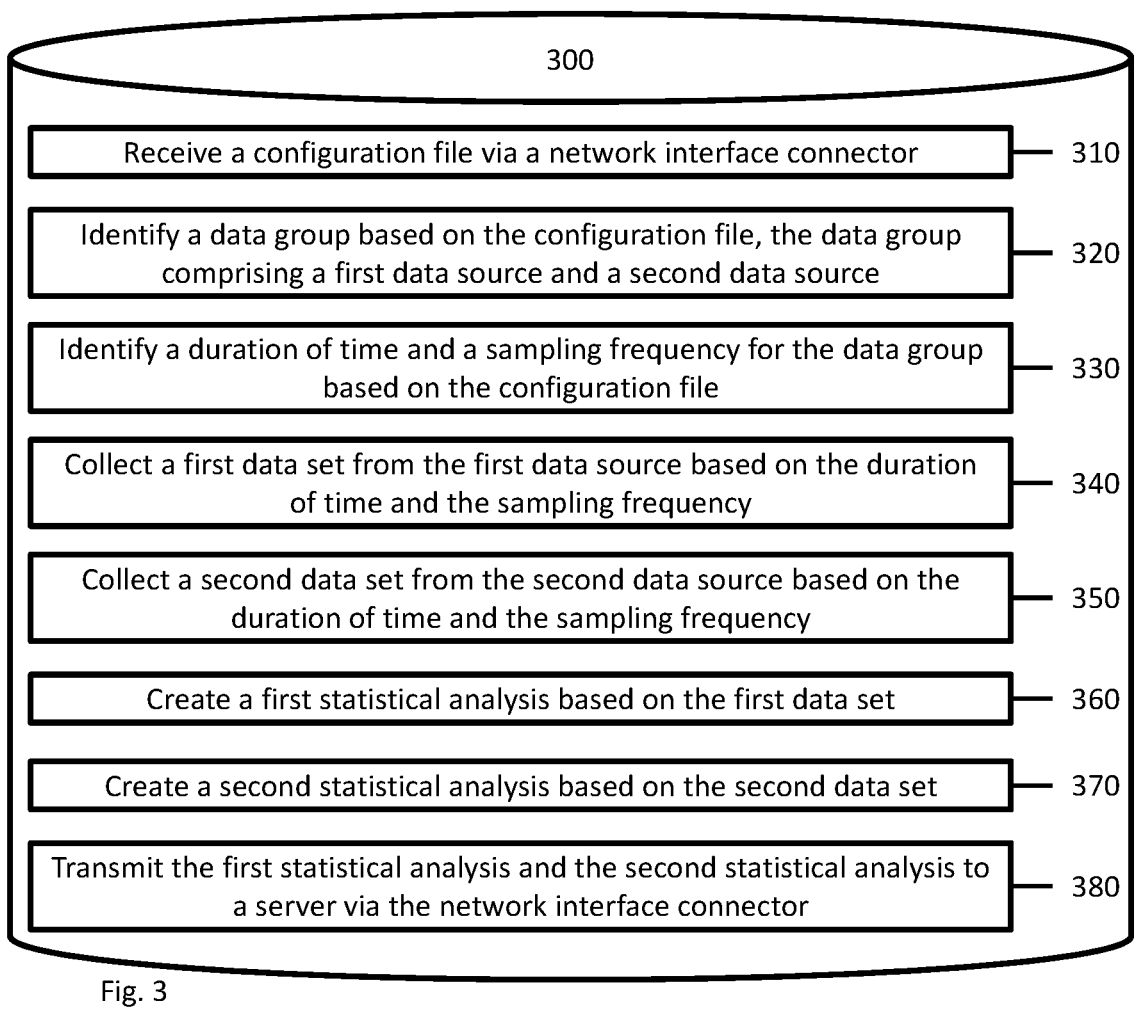
FIG. 3 shows a computer-readable medium storing machine-readable instructions to cause a processor to create statistical analyses of data sets from a data group for transmission to a server in accordance with various examples.

FIG. 3 shows a computer-readable medium 300 storing machine-readable instructions 310, 320, 330, 340, 350, 360, 370, 380 to cause a processor to create statistical analyses of data sets from a data group for transmission to a server in accordance with various examples. Machine-readable instruction 310, when executed by the processor, may cause the processor to receive a configuration file via a network interface connector. Machine-readable instruction 320, when executed by the processor, may cause the processor to identify a data group based on the configuration file, the data group comprising a first data source and a second data source. Machine-readable instruction 330, when executed by the processor, may cause the processor to identify a duration of time and a sampling frequency for the data group based on the configuration file. Machine-readable instruction 340, when executed by the processor, may cause the processor to collect a first data set from the first data source based on the duration of time and the sampling frequency. Machine-readable instruction 350, when executed by the processor, may cause the processor to collect a second data set from the second data source based on the duration of time and the sampling frequency. Machine-readable instruction 360, when executed by the processor, may cause the processor to create a first statistical analysis based on the first data set. Machine-readable instruction 370, when executed by the processor, may cause the processor to create a second statistical analysis based on the second data set. Machine-readable instruction 380, when executed by the processor, may cause the processor to transmit the first statistical analysis and the second statistical analysis to a server via the network interface connector.

The configuration file may specify data groups. A data group may include data sources with the same, or nearly the same, settings, such as the start time, duration of time, or sampling frequency. A data group may include data sources that provide related data, such as processor temperature, processor utilization, processor power consumption, or other measurements related to a processor. The focus of a data group may be related to display brightness, applications in use, power consumption, or battery use.

Figure 4:
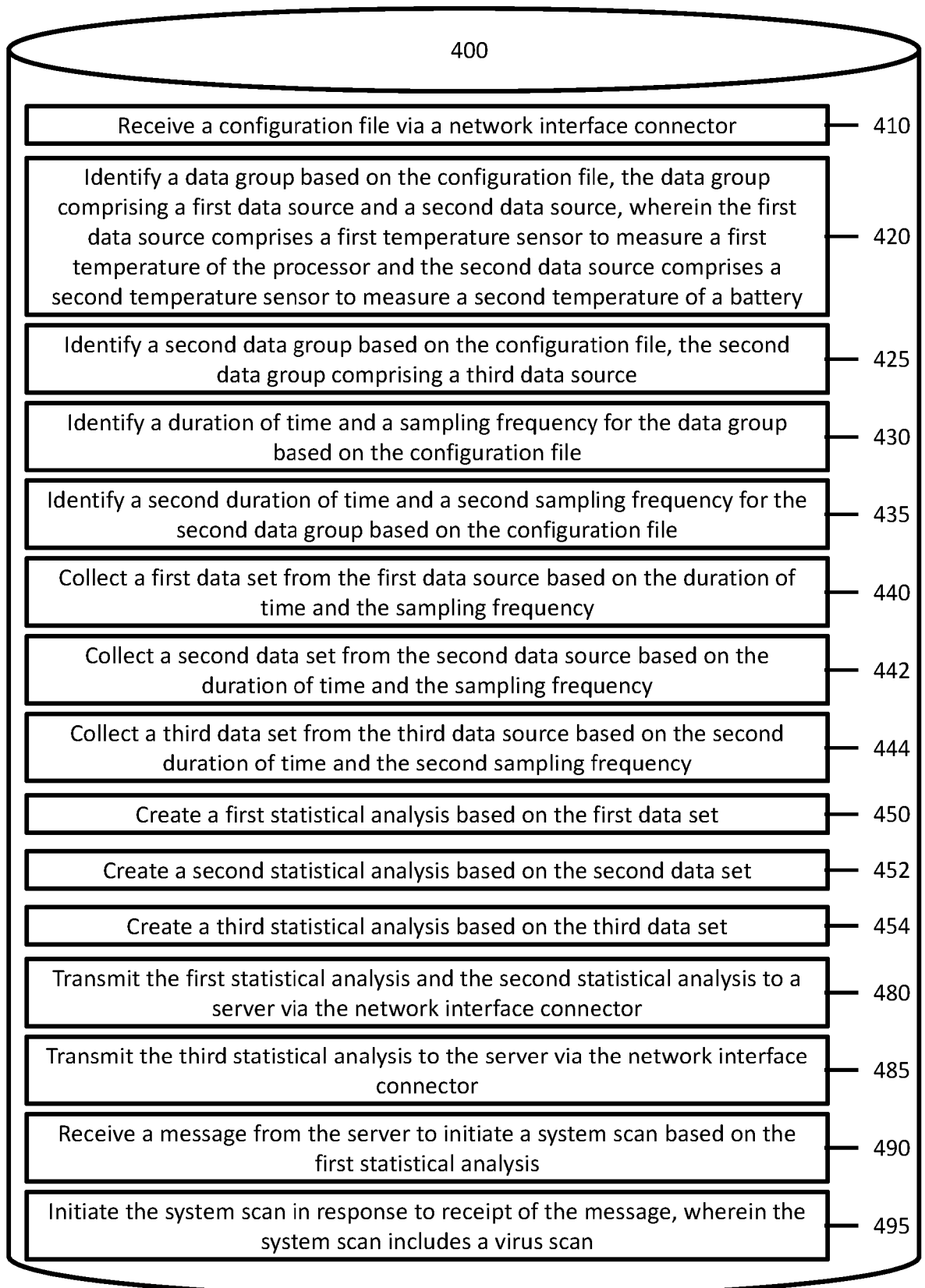
FIG. 4 shows a computer-readable medium storing machine-readable instructions to cause a processor to create statistical analyses of data sets from data groups for transmission to a server and receiving a message to initiate a system scan based on a statistical analysis in accordance with various examples.

FIG. 4 shows a computer-readable medium 400 storing machine-readable instructions 410, 420, 425, 430, 435, 440, 442, 444, 450, 452, 454, 480, 485, 490, 495 to cause a processor to create statistical analyses of data sets from data groups for transmission to a server and receiving a message to initiate a system scan based on a statistical analysis in accordance with various examples. Machine-readable instruction 410, when executed by the processor, may cause the processor to receive a configuration file via a network interface connector. Machine-readable instruction 420, when executed by the processor, may cause the processor to identify a data group based on the configuration file, the data group comprising a first data source and a second data source, wherein the first data source comprises a first temperature sensor to measure a first temperature of the processor and the second data source comprises a second temperature sensor to measure a second temperature of a battery. Machine-readable instruction 425, when executed by the processor, may cause the processor to identify a second data group based on the configuration file, the second data group comprising a third data source. Machine-readable instruction 430, when executed by the processor, may cause the processor to identify a duration of time and a sampling frequency for the data group based on the configuration file. Machine-readable instruction 435, when executed by the processor, may cause the processor to identify a second duration of time and a second sampling frequency for the second data group based on the configuration file. Machine-readable instruction 440, when executed by the processor, may cause the processor to collect a first data set from the first data source based on the duration of time and the sampling frequency. Machine-readable instruction 442, when executed by the processor, may cause the processor to collect a second data set from the second data source based on the duration of time and the sampling frequency. Machine-readable instruction 444, when executed by the processor, may cause the processor to collect a third data set from the third data source based on the second duration of time and the second sampling frequency. Machine-readable instruction 450, when executed by the processor, may cause the processor to create a first statistical analysis based on the first data set. Machine-readable instruction 452, when executed by the processor, may cause the processor to create a second statistical analysis based on the second data set. Machine-readable instruction 454, when executed by the processor, may cause the processor to create a third statistical analysis based on the third data set. Machine-readable instruction 480, when executed by the processor, may cause the processor to transmit the first statistical analysis and the second statistical analysis to a server via the network interface connector. Machine-readable instruction 485, when executed by the processor, may cause the processor to transmit the third statistical analysis to the server via the network interface connector. Machine-readable instruction 490, when executed by the processor, may cause the processor to receive a message from the server to initiate a system scan based on the first statistical analysis. Machine-readable instruction 495, when executed by the processor, may cause the processor to initiate the system scan in response to receipt of the message, wherein the system scan includes a virus scan.

In various examples, the collection of data from a data source may be set up by the processor but transfer the data from the data source to memory or storage with minimal involvement of the processor. This may be accomplished by setting up direct memory access between the data source and the memory or storage. The processor may be involved with configuring the data collection and direct memory access and may receive notification when the collection is completed. The processor may then receive the data to perform a statistical analysis.

Figure 5:
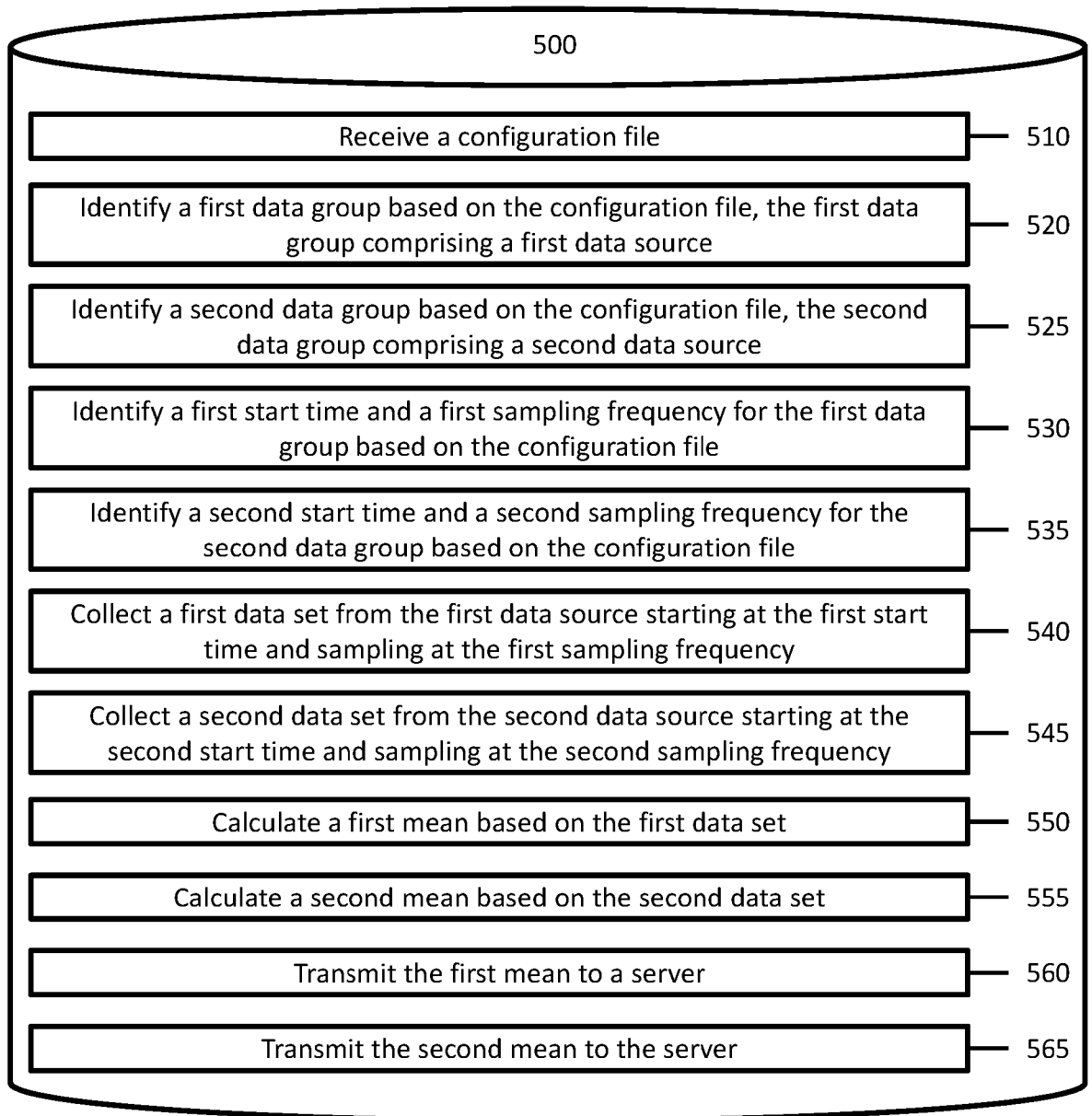
FIG. 5 shows a computer-readable medium storing machine-readable instructions to cause a processor to create statistical analyses of data sets from data groups for transmission to a server in accordance with various examples.

FIG. 5 shows a computer-readable medium 500 storing machine-readable instructions 510, 520, 525, 530, 535, 540, 545, 550, 555, 560, 565 to cause a processor to create statistical analyses of data sets from data groups for transmission to a server in accordance with various examples. Machine-readable instruction 510, when executed by the processor, may cause the processor to receive a configuration file. Machine-readable instruction 520, when executed by the processor, may cause the processor to identify a first data group based on the configuration file, the first data group comprising a first data source. Machine-readable instruction 525, when executed by the processor, may cause the processor to identify a second data group based on the configuration file, the second data group comprising a second data source. Machine-readable instruction 530, when executed by the processor, may cause the processor to identify a first start time and a first sampling frequency for the first data group based on the configuration file. Machine-readable instruction 535, when executed by the processor, may cause the processor to identify a second start time and a second sampling frequency for the second data group based on the configuration file. Machine-readable instruction 540, when executed by the processor, may cause the processor to collect a first data set from the first data source starting at the first start time and sampling at the first sampling frequency. Machine-readable instruction 545, when executed by the processor, may cause the processor to collect a second data set from the second data source starting at the second start time and sampling at the second sampling frequency. Machine-readable instruction 550, when executed by the processor, may cause the processor to calculate a first mean based on the first data set. Machine-readable instruction 555, when executed by the processor, may cause the processor to calculate a second mean based on the second data set. Machine-readable instruction 560, when executed by the processor, may cause the processor to transmit the first mean to a server. Machine-readable instruction 565, when executed by the processor, may cause the processor to transmit the second mean to the server.

Figure 6:
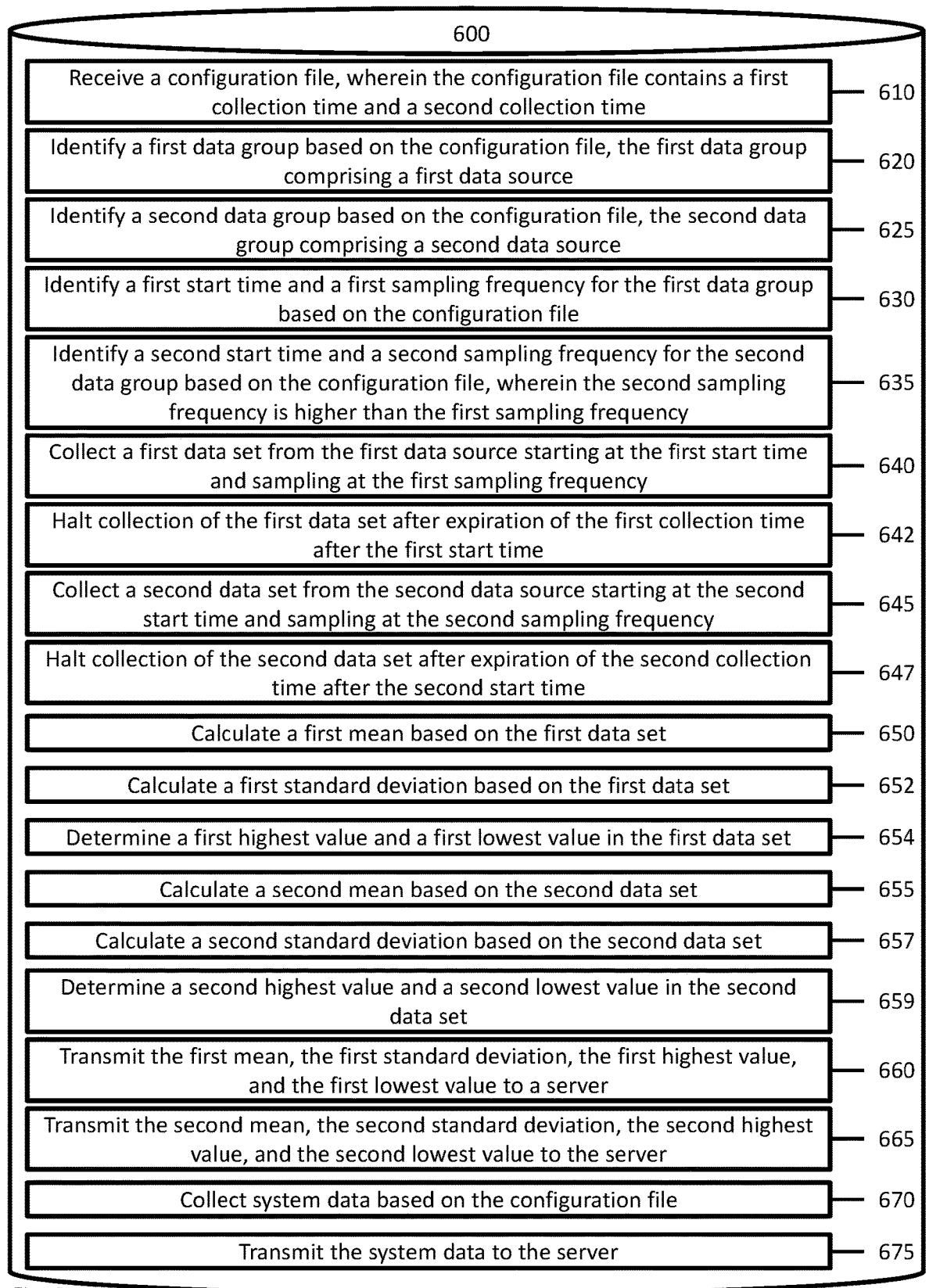
FIG. 6 shows a computer-readable medium storing machine-readable instructions to cause a processor to create statistical analyses of data sets from data groups for transmission to a server, the data sets including data collected starting at a start time and sampled at a sampling frequency in accordance with various examples.

FIG. 6 shows a computer-readable medium 600 storing machine-readable instructions 610, 620, 625, 630, 635, 640, 642, 645, 647, 650, 652, 654, 655, 657, 659, 660, 665, 670, 675 to cause a processor to create statistical analyses of data sets from data groups for transmission to a server, the data sets including data collected starting at a start time and sampled at a sampling frequency in accordance with various examples. Machine-readable instruction 610, when executed by the processor, may cause the processor to receive a configuration file, wherein the configuration file contains a first collection time and a second collection time. Machine-readable instruction 620, when executed by the processor, may cause the processor to identify a first data group based on the configuration file, the first data group comprising a first data source. Machine-readable instruction 625, when executed by the processor, may cause the processor to identify a second data group based on the configuration file, the second data group comprising a second data source. Machine-readable instruction 630, when executed by the processor, may cause the processor to identify a first start time and a first sampling frequency for the first data group based on the configuration file. Machine-readable instruction 635, when executed by the processor, may cause the processor to identify a second start time and a second sampling frequency for the second data group based on the configuration file, wherein the second sampling frequency is higher than the first sampling frequency. Machine-readable instruction 640, when executed by the processor, may cause the processor to collect a first data set from the first data source starting at the first start time and sampling at the first sampling frequency. Machine-readable instruction 642, when executed by the processor, may cause the processor to halt collection of the first data set after expiration of the first collection time after the first start time. Machine-readable instruction 645, when executed by the processor, may cause the processor to collect a second data set from the second data source starting at the second start time and sampling at the second sampling frequency. Machine-readable instruction 647, when executed by the processor, may cause the processor to halt collection of the second data set after expiration of the second collection time after the second start time. Machine-readable instruction 650, when executed by the processor, may cause the processor to calculate a first mean based on the first data set. Machine-readable instruction 652, when executed by the processor, may cause the processor to calculate a first standard deviation based on the first data set. Machine-readable instruction 654, when executed by the processor, may cause the processor to determine a first highest value and a first lowest value in the first data set. Machine-readable instruction 655, when executed by the processor, may cause the processor to calculate a second mean based on the second data set. Machine-readable instruction 657, when executed by the processor, may cause the processor to calculate a second standard deviation based on the second data set. Machine-readable instruction 659, when executed by the processor, may cause the processor to determine a second highest value and a second lowest value in the second data set. The second highest value may be the highest value in the second data set, as opposed to the second-highest value in the second data set. The second lowest value may be the lowest value in the second data set, as opposed to the second-lowest value in the second data set. Machine-readable instruction 660, when executed by the processor, may cause the processor to transmit the first mean, the first standard deviation, the first highest value, and the first lowest value to a server. Machine-readable instruction 665, when executed by the processor, may cause the processor to transmit the second mean, the second standard deviation, the second highest value, and the second lowest value to the server. Machine-readable instruction 670, when executed by the processor, may cause the processor to collect system data based on the configuration file. Machine-readable instruction 675, when executed by the processor, may cause the processor to transmit the system data to the server.

The configuration file may specify the duration of time by including a start time and a collection time. The collection time may act as an amount of time that starts at the start time. The duration of time may be the time between the start time and the start time plus the collection time amount. In various examples the start time may be 6:00 a.m. and the collection time may be an hour, thus the data collection ends at 7:00 a.m. The start time or other times may include dates specifying a day on which the data collection is to occur. The start time may be 6:00 a.m. on Oct. 2, 2017. Additional data may be used, such as a time zone or how to account for daylight savings time. If a time zone is specified, it may be a different time zone that the processor is located in.

In various examples, the statistical analysis may occur while data collection is still ongoing. If the statistical analysis is to determine the highest value and lowest value in the data set, the processor may retain the highest and lowest values, discarding additional data points that do not change the highest or lowest values of the data set as the data points are collected. A mean could be calculated on a running basis by preserving a mean value of the data points collected and a number of data points the mean is based on. On receipt of a new data point in the data set, the new data point and the running mean could be combined by weighing the running mean based on the number of data points already considered.

In various examples, system data may include a model identification number for the system; a model identification number for various components, such as a processor, memory, motherboard, or storage; version information for applications on the computer system, such as the operating system, device drivers, or a word processing application; geographical data, which may be determinable by the IP address in use; data related to the system's location within a network topography; or unique identification of the system, such using a globally unique identifier (GUID) or a media access control (MAC) address.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing machine-readable instructions that, when executed by a processor, cause the processor to:
   receive a configuration file via a network interface connector;
   identify a first data source coupled to the processor based on the configuration file;
   collect a first data set from the first data source for a duration of time, the duration of time based on the configuration file;
   create a first statistical analysis based on the first data set;
   transmit the first statistical analysis to a server via the network interface connector;
   receive a message from the server to initiate a system scan based on the first statistical analysis; and
   initiate the system scan in response to receipt of the message.

2. The non-transitory computer-readable medium of claim 1, wherein the machine-readable instructions, when executed by the processor, cause the processor to:
   identify a second data source coupled to the processor based on the configuration file;
   collect a second data set from the second data source for the duration of time; and
   create a second statistical analysis based on the second data set, wherein transmission of the first statistical analysis to the server includes transmission of the second statistical analysis to the server.

3. The non-transitory computer-readable medium of claim 2, wherein the machine-readable instructions, when executed by the processor, cause the processor to:
   collect a third data set from the first data source for a second duration of time based on the configuration file, the start of the second duration of time being after the end of the first duration of time;
   create a third statistical analysis based on the third data set;
   collect a fourth data set from the second data source for the second duration of time; and
   create a fourth statistical analysis based on the fourth data set, where transmission of the first statistical analysis to the server includes transmission of the third statistical analysis and fourth statistical analysis to the server.

4. The non-transitory computer-readable medium of claim 2, wherein the first data set includes a temperature of the processor and the second data set includes a utilization amount of the processor.

5. The non-transitory computer-readable medium of claim 1, wherein the machine-readable instructions, when executed by the processor, cause the processor to receive a message from the server to backup the computer-readable medium based on the first statistical analysis.

6. A non-transitory computer-readable medium storing machine-readable instructions that, when executed by a processor, cause the processor to:
   receive a configuration file via a network interface connector;
   identify a data group based on the configuration file, the data group comprising a first data source and a second data source;
   identify a duration of time and a sampling frequency for the data group based on the configuration file;
   collect a first data set from the first data source based on the duration of time and the sampling frequency;
   collect a second data set from the second data source based on the duration of time and the sampling frequency;
   create a first statistical analysis based on the first data set;
   create a second statistical analysis based on the second data set;
   transmit the first statistical analysis and the second statistical analysis to a server via the network interface connector;
   receive a message from the server to initiate a system scan based on the first statistical analysis; and
   initiate the system scan in response to receipt of the message.

7. The non-transitory computer-readable medium of claim 6, wherein the first data source comprises a first temperature sensor to measure a first temperature of the processor and the second data source comprises a second temperature sensor to measure a second temperature of a battery.

8. The non-transitory computer-readable medium of claim 7, wherein the machine-readable instructions, when executed by the processor, cause the processor to:
   identify a second data group based on the configuration file, the second data group comprising a third data source;
   identify a second duration of time and a second sampling frequency for the second data group based on the configuration file;
   collect a third data set from the third data source based on the second duration of time and the second sampling frequency;
   create a third statistical analysis based on the third data set; and
   transmit the third statistical analysis to the server via the network interface connector.

9. The non-transitory computer-readable medium of claim 6, wherein the system scan includes a virus scan.

10. A non-transitory computer-readable medium storing machine-readable instructions that, when executed by a processor, cause the processor to:
    receive a configuration file;
    identify a first data group based on the configuration file, the first data group comprising a first data source;
    identify a second data group based on the configuration file, the second data group comprising a second data source;
    identify a first start time and a first sampling frequency for the first data group based on the configuration file;
    identify a second start time and a second sampling frequency for the second data group based on the configuration file;
    collect a first data set from the first data source starting at the first start time and sampling at the first sampling frequency;

halt collection of the first data set after expiration of a first collection time after the first start time, the first collection time contained in the configuration file;

collect a second data set from the second data source starting at the second start time and sampling at the second sampling frequency;

halt collection of the second data set after expiration of a second collection time after the second start time, the second collection time contained in the configuration file;

calculate a first mean based on the first data set;

calculate a second mean based on the second data set;

transmit the first mean to a server; and transmit the second mean to the server.

11. The non-transitory computer-readable medium of claim 10, wherein execution of the machine-readable instructions by the processor causes the processor to:

calculate a first standard deviation based on the first data set;

determine a first highest value and a first lowest value in the first data set;

calculate a second standard deviation based on the second data set; and determine a second highest value and a second lowest value in the second data set, wherein transmission of the first mean to the server includes transmission of the first standard deviation, the first highest value, and first lowest value to the server, and transmission of the second mean to the server includes transmission of the second standard deviation, the second highest value, and the second lowest value to the server.

12. The non-transitory computer-readable medium of claim 10, wherein the second sampling frequency is higher than the first sampling frequency.

13. The non-transitory computer-readable medium of claim 10, wherein execution of the machine-readable instructions by the processor causes the processor to:

collect system data based on the configuration file; and transmit the system data to the server.

* * * * *